H. BYRD.
INDIVIDUAL SEPTIC TANK.
APPLICATION FILED OCT. 12, 1917.
1,334,986.
Patented Mar. 30, 1920.
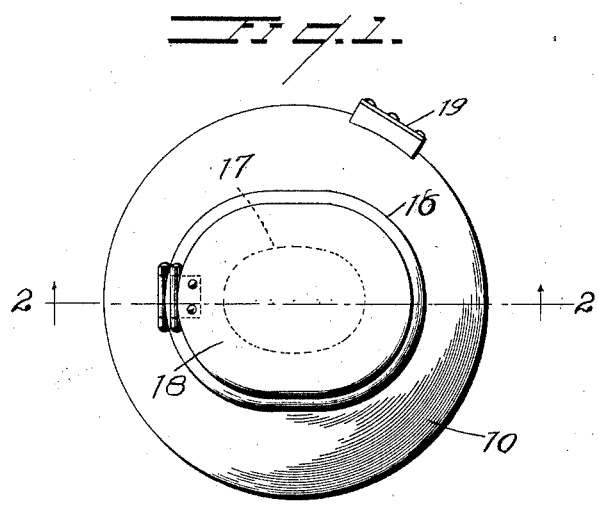
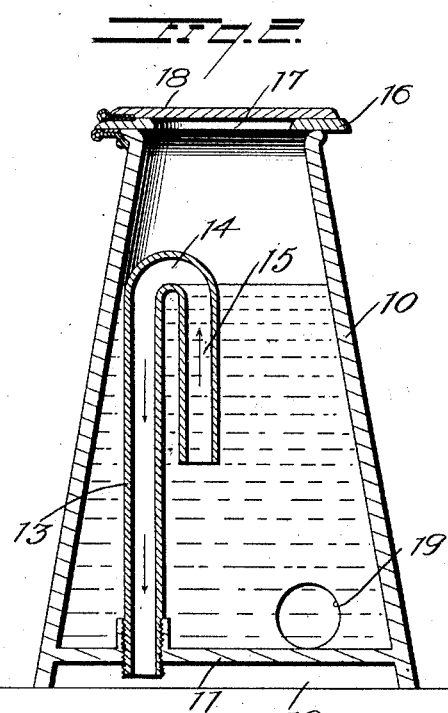
WITNESSES
INVENTOR
HIRAM BYRD
BY
ATTORNEYS

UNITED STATES PATENT OFFICE.

HIRAM BYRD, OF JACKSONVILLE, FLORIDA.

INDIVIDUAL SEPTIC TANK.

1,334,986. Specification of Letters Patent. Patented Mar. 30, 1920.

Application filed October 12, 1917. Serial No. 196,279.

*To all whom it may concern:*

Be it known that I, HIRAM BYRD, a citizen of the United States, and a resident of Jacksonville, in the county of Duval and State of Florida, have invented a new and useful Improvement in Septic Tanks, of which the following is a specification.

My present invention relates generally to septic tanks and more particularly to a novel, simple construction thereof adapted for family use, and designed especially for use in connection with porous soil or rock formation, but which may however, be adapted to any formation by simple additions which will be presently described.

Systems of the general nature of the present one, which do away with the solids of waste matter usually involve tanks which are buried in the ground, as distinguished from which my invention proposes a surface tank which utilizes the upper strata of soil adjacent to the tank in the capacity of a filter, instead of utilizing sub-strata of the soil or especially constructed filters in connection therewith.

One of the objects of my present improvement is the provision of a septic tank discharging through the base thereof and provided with discharge means adapted to recurrently operate to discharge only the fluid above the sediment and normally sealed by the contents of the tank in order to maintain the latter in operative condition at all times.

A still further object of my invention is to provide a tank containing either within or as a part thereof all of the features necessary for its subsequent successful operation, from and after manufacture, in order to adapt the same to transportation and installation as a single unit, various numbers of which may be utilized in adjacent relation if so desired.

The preferred form of my invention is illustrated in the accompanying drawing, forming a part of this specification, and in which:

Figure 1 is a top plan view thereof, and

Fig. 2 is a vertical section taken substantially on line 2—2 of Fig. 1.

Referring now to these figures, my invention proposes a tank generally indicated at 10 which may be in the form of a frustum of a cone, its wall depending slightly below its horizontal base 11, at the lower portion thereof, in order to provide beneath said base 11 a discharge space 12 from which the liquid discharged may seep through the soil upon which the tank is disposed, or sub-irrigation tile and the like, in localities where the surface soil is of a compact non-porous nature.

It is obvious from the foregoing that the tank as proposed by my invention is adapted for surface installation, that is to rest above the surface of the ground, or set slightly thereinto, as distinguished from burying of tanks of this nature as usual.

Through the base 11 opens the lower discharge end of a discharge pipe 13 projecting vertically within the tank and having at its upper end a goose neck bend 14 and a depending extension 15, the latter open at its lower end within the tank at a point substantially above the base, so as to thus constitute an arrangement by which the fluid discharged from the tank will be taken from a point materially below the surface thereof and will be recurrently discharged, that is at periods when the surface of the fluid approaches the top of the goose neck bend 14.

It is to be observed that as the fluid within the tank normally extends up into the discharge pipe extension 15 as shown, an effective seal is formed which, with the construction to be presently described, provides for maintenance of the tank in operative condition at all times.

To the upper smaller and open end of the tank 10 is a hinged seat 16, apertured as usual at 17, and normally closed by a hinged cover 18.

It is therefore apparent that instead of disposition directly upon the soil, the tank as proposed by my invention may be utilized above the ground and in suitable localities, by extending the discharge pipe below the base 10 and to the ground, and it is further obvious that it is inexpensive in the first instance, obviates the necessity of special skill to install, is simple in design with nothing to get out of order, and is readily portable and entirely sanitary.

The tank obviously requires cleaning but once in a great while, which may be effected in order to remove accumulated sludge in the bottom of the tank, by means of a man-hole in the tank wall, located for instance, as at 19 in Fig. 2, adjacent to the base 11.

I claim:

1. An individual septic tank, the same being frusto-conical in shape and having its upper and smaller end open, and the base closed, an apertured seat mounted on said upper end, and the base provided with a continuous flange depending at its periphery, a still water discharge pipe opening at its outer end through the tank base within the space inclosed by the same and its depending flange and having its inner end curved downwardly within the tank above the said base, said tank being otherwise closed to preserve still water therein, for the purpose specified.

2. An individual septic tank, the same being frusto-conical in shape and having a closed base and an upper open end, an apertured seat and a seat cover at the upper open end of the tank and normally closing the same, and a discharge pipe opening at its outer end through the tank base and having its inner end curved downwardly within the tank above the said base, said tank being otherwise closed to preserve still water therein for the purpose described.

HIRAM BYRD.

Witnesses:
ROY CAMPBELL,
DOMARIS HERNDONE.